No. 633,342. Patented Sept. 19, 1899.
J. E. DURHAM & J. E. DEVINE.
BASKET MAKING MACHINE.
(Application filed Dec. 22, 1898.)
(No Model.) 3 Sheets—Sheet 1.
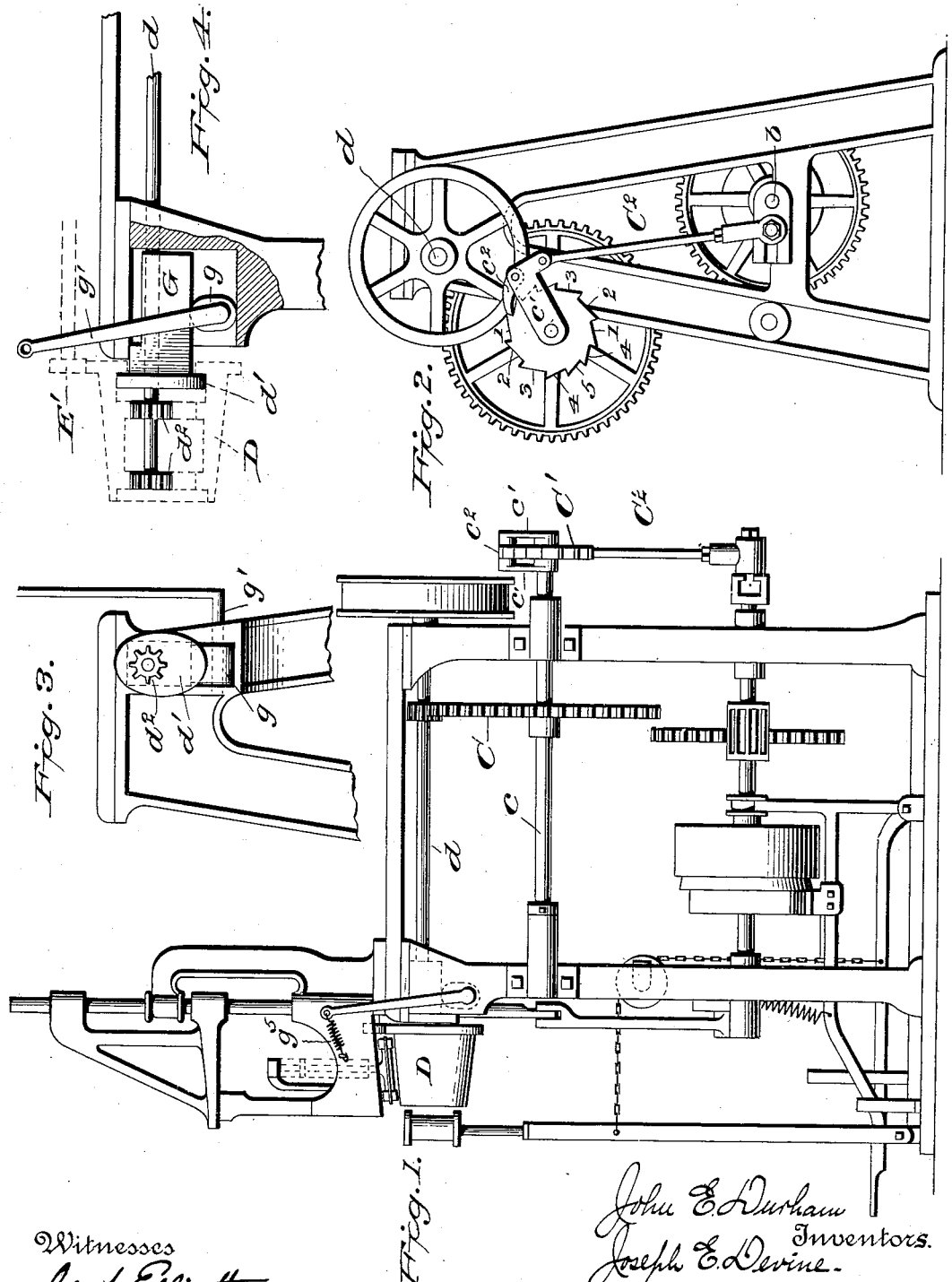

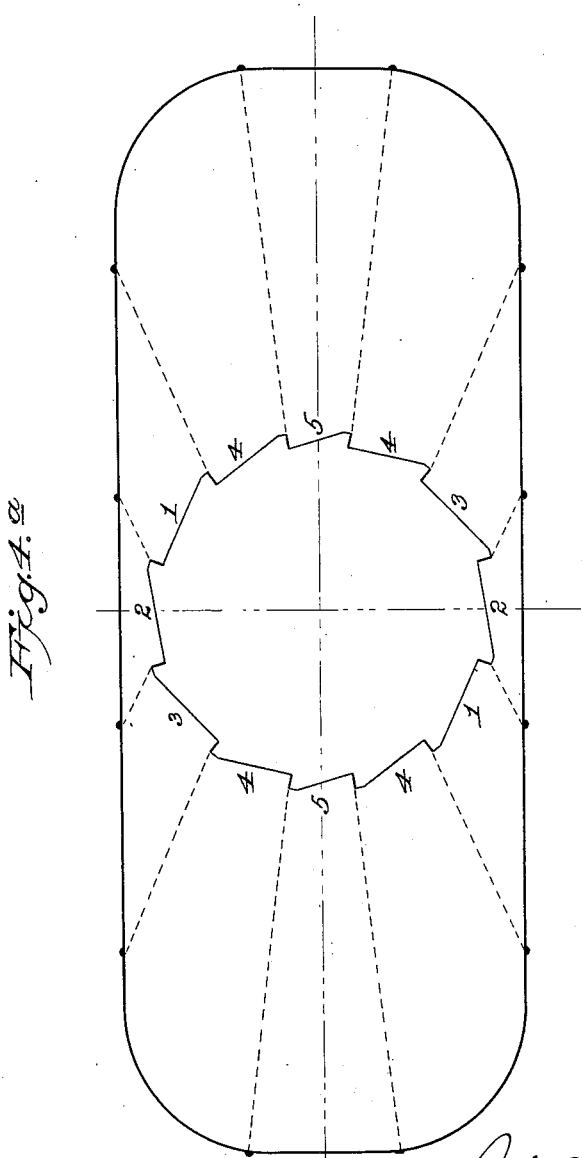

No. 633,342. Patented Sept. 19, 1899.
J. E. DURHAM & J. E. DEVINE.
BASKET MAKING MACHINE.
(Application filed Dec. 22, 1898.)
(No Model.) 3 Sheets—Sheet 3.
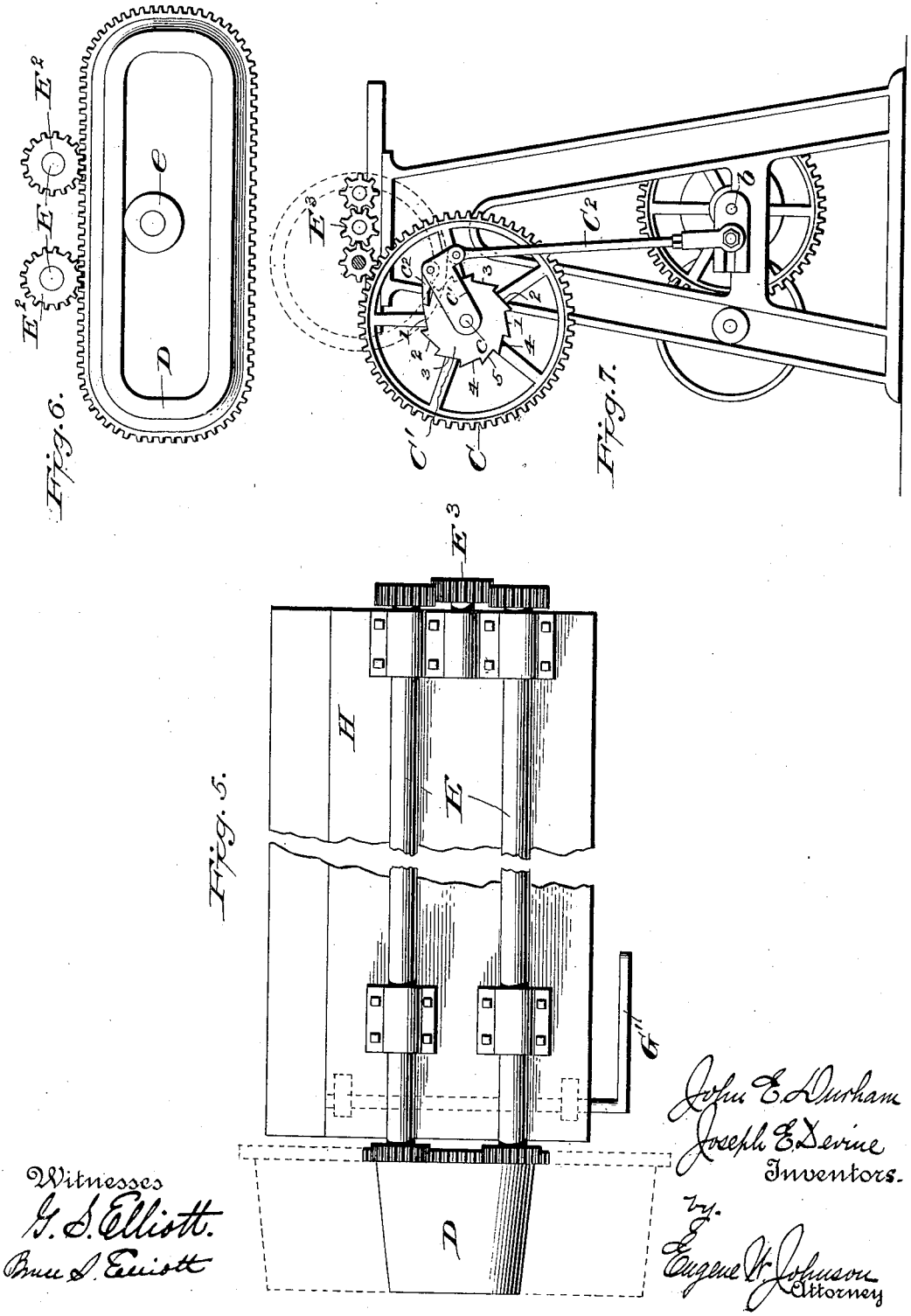

United States Patent Office.

JOHN E. DURHAM AND JOSEPH E. DEVINE, OF DOUGLAS, MICHIGAN, ASSIGNORS TO ELMER E. WEED, D. MILTON GERBER, AND CORNELIUS GERBER, OF SAME PLACE.

BASKET-MAKING MACHINE.

SPECIFICATION forming part of Letters Patent No. 633,342, dated September 19, 1899.

Application filed December 22, 1898. Serial No. 700,006. (No model.)

*To all whom it may concern:*

Be it known that we, JOHN E. DURHAM and JOSEPH E. DEVINE, citizens of the United States, residing at Douglas, in the county of Allegan and State of Michigan, have invented new and useful Improvements in Basket-Making Machines, of which the following is a specification.

This invention relates to certain new and useful improvements in basket-making machines; and the present invention consists in the combination, with the stapling mechanism, of a form upon which the component parts of the basket are assembled, said form being mounted rotatably beneath the stapling mechanism and supported so as to be movable to and from the same to accommodate different thicknesses of stock.

The invention further consists in the means for actuating the basket-form, so that the impulses or movements thereof will be such that the staples will be driven through the sides and ends of the basket, avoiding the bends or curves, as will be hereinafter set forth, and specifically pointed out in the claims.

The machine is designed especially for the manufacture of basket or fruit packages, as known to the trade as the "climax basket," and is an improvement upon the machine patented by us on the 7th day of June, 1898, No. 605,408.

In the accompanying drawings, Figure 1 is a side elevation of a basket-making machine, showing our improvement applied thereto. Fig. 2 is a rear elevation or end view, the stapling mechanism being omitted. Fig. 3 is a detail view, the same being a front elevation showing the movable support for the basket-form and manner of raising said support. Fig. 4 is a side view, partly in section, projected from Fig. 3, the basket-form being shown in dotted lines. Fig. 4ᵃ is a view in the nature of a diagram showing the ratchet-wheel and the position of the staples in the completed basket. Fig. 5 is a plan view of a modification showing a movable table-top, to which are attached the guiding-shafts and support for the form. Fig. 6 is a front view of the form and driving mechanism shown in Fig. 5, and Fig. 7 is an end elevation.

The frame, stapling-machine, and general construction of the machine, except as hereinafter described, is similar to that shown in the patent hereinbefore referred to.

In the manufacture of baskets the thickness of the stock—that is, the splints and hoops—will vary, and in order to provide for such variation in size the form D, upon which the component parts of the basket are assembled, is supported so as to be movable to and from the fixed stapling-machine. The basket-form D has rack-teeth, with which engage pinions $d^2$, carried by a driven shaft $d$, which shaft passes through a vertically-adjustable bearing-box G, which box has attached a plate $d'$, which holds the basket-form in engagement with the bearing-box G. The bearing-box G is seated in a recess in the frame, and in the lower portion of said recess is positioned a cam $g$, which cam is rigidly keyed to an arm G', journaled in the frame. The arm G' may be provided at its upper end with a spring $g^5$, which is made fast to a fixed part of the machine, the tendency of said spring being to actuate the cam so as to raise the bearing-box and basket-form, holding the basket-form in close contact with the ends of the staple-drivers of the stapling-machine. The cam may be of any suitable type to accomplish the end in view. The opposite end of the shaft $d$ is loosely journaled in the frame, as but a very small range of movement is required to accomplish the end in view.

Where the basket-form is provided with external rack-teeth, as shown in Figs. 5 and 6 of the drawings, the same is preferably driven by pinions $E^2$, which are mounted on parallel shafts E, and in such case the interior of the basket-form has a track with which engages a guide-roller $e$. When shafts E E are used, the pinions thereon occupy the same relative positions as are occupied by the guide-rollers E'. (Shown in Fig. 4.) In order to drive the shafts E E in the same direction and at the same rate of speed, they are connected or geared to each other by a pinion $E^3$.

The section of the table-top H shown in Fig. 5 carries the basket-form and gearing therefor, and the end of said table-top may be raised and lowered by cams mounted on a bent arm G', and said arm may hold the form against the staple-driving mechanism by gravity, a weight being attached thereto, or the end of the arm can be weighted.

It is within the scope of our invention to provide other means for holding the form, with the component parts of the basket thereon, in engagement with the staple-drivers or staple-guides of the stapling-machine than herein shown. For instance, the movement may be accomplished by springs located beneath the bearing-box G or under the front end of the movable part of the table-top, though we prefer to use the mechanism shown, as it allows the form to be lowered quickly in placing the inner hoops and first splints thereon.

In the manufacture of a basket of the climax type it is desirable that the staples should be driven through the sides and ends of the basket and the rounded or curved corners should be avoided, for if staples were driven therethrough they would be liable to split the hoops and splints. It is also desirable that the staples should be driven when the basket-form is at rest. To accomplish the ends set forth, the driving-shafts which actuate the form are given an intermittent or step-by-step movement. This is accomplished by providing the basket-form with rack-teeth, with which mesh pinions carried by the driving shaft or shafts, said driving-shafts being actuated by a gear-wheel C, mounted upon a shaft $c$, said gear-wheel meshing with a small pinion on the shaft which carries the pinions which mesh with the rack-teeth of the form. The shaft $c$ has rigidly attached thereto a ratchet-wheel C', and straddling said ratchet-wheel is a frame made up of side plates $c'$, said plates being connected to a pitman-rod $C^2$, the plates also carrying between them a pawl $c^2$. The pitman-rod is connected by a wrist-pin to a shaft $b$, which shaft is suitably driven and in turn drives the staple making and driving mechanism, the same being connected thereto by a pitman-rod $b'$.

The ratchet-wheel C' is constructed so as to have on opposite sides of its center three similar teeth with comparatively long faces 1 2 3. Adjacent to the teeth 1 and 3 are teeth 4, the faces of which are slightly shorter than the faces of the teeth 1, 2, and 3, and the next teeth 5 have faces which are still shorter. This ratchet-wheel determines the movement of the form, and while the pawl is making its back movement the form will be at rest and the staples will be driven into the parts of the basket assembled on the form. The teeth or long faces 1, 2, and 3 of the ratchet-wheel correspond with the distance between the staples in the side of the basket, the teeth 4 govern the movement at the curved corners, and the teeth 5 govern the distance between the staples at the ends of the basket.

The form has imparted thereto a step-by-step movement and turns continuously over the pinion or guide-roller, as set forth in the patent hereinbefore referred to.

With the ratchet-wheel shown the impulses given to the shaft $c$, its gear-wheel, which actuates the form indirectly, are irregular and a differential drive is provided.

Fig. 4$^a$ of the drawings illustrates the contour of the basket-form or basket and one form of ratchet-wheel, and with such a ratchet-wheel when interposed between the gearing for the stapler and basket-form certain teeth of the ratchet-wheel will actuate the gearing between the ratchet-wheel and the basket-form, so that the rounded corners of the basket-form will be carried past the stapler to avoid driving the staples in the bent part of the work. In the production of a climax basket, which has ten staples through its upper and lower hoops, a ratchet-wheel with teeth proportioned, as shown, will give the result desired; but it is obvious that in practice it is only necessary that the teeth of the ratchet, which actuates the gearing to move the form at its corners, should be properly situated and of such a length as to carry the form by the stapler, so as to avoid the insertion of staples in the bent parts of the hoops and splints, and it is obvious that with a change of gearing the number of teeth may be increased or diminished.

Having thus described our invention, what we claim as new, and desire to secure by Letters Patent, is—

1. The combination in a basket-making machine, of a stapler mounted in a fixed position above a basket-form, a basket-form upon which the parts of the basket are assembled, a guide upon which the basket-form is mounted, means for driving the form so as to impart thereto a range of movement which is alternately horizontal beneath the stapler and in quadrant arcs in turning the corners thereof, and means for raising and lowering the guide and the basket-form which is mounted thereon.

2. In a basket-making machine, the combination with a stapler, of a form mounted beneath the same and in gear therewith, means for supporting and actuating the form so as to impart thereto a longitudinal movement for the length of each side and an intermediate turning or rotative movement at the corners, and means for raising and lowering in unison the means for supporting and actuating the form, substantially as shown.

3. In a basket-making machine, a form having a rack, a guide upon which the form turns, a shaft having a pinion which engages with the rack, means for raising and lowering the form, the guide and the driving means, a stapler mounted above the form and means for adjusting the form, its guide and driving means to and from the stapler, for the purpose set forth.

4. In a basket-making machine, the combination with a stapling-machine and a form upon which the parts of a basket are assembled, of driving means for the form including a ratchet-wheel with teeth spaced and proportioned so as to carry the rounded corners of the form by the stapling-machine, to avoid the rounded corners or bent parts of the basket, substantially as set forth.

5. In a basket-making machine, the combination with the fixed stapling mechanism and basket-form mounted rotatively beneath the same, of gearing between the stapling-machine and basket-form driven by a shaft common to both, a pawl-and-ratchet mechanism between the staple-driving gearing and the driving-gearing for the basket-form, the teeth of the ratchet-wheel with which the pawl engages and pinions which mesh with racks of the form which are spaced so as to impart a range of movement to the basket-form which will carry the rounded corners of the form by the stapling mechanism while it is at rest, for the purpose set forth.

6. In combination with a stapling-machine and basket-form, of gearing operating the form actuated by gearing which operates the stapling-machine, an interposed ratchet-wheel and its pawl, the ratchet-wheel having on opposite sides of its center a plurality of like teeth, adjacent thereto teeth with less space between them, and a still shorter tooth adjoining, together with a basket-form having a rack, and pinions for driving the form, the shaft with the pinions being actuated by the ratchet-wheel, substantially as shown.

7. In a basket-making machine, the combination with a stapler and a basket-form having rounded corners, of a drive-shaft, gearing connecting the drive-shaft to the stapler, other gearing connecting the drive-shaft to the basket-form, a pawl and ratchet-wheel for actuating the driving mechanism for the basket-form, the ratchet-wheel having for the corners of the form teeth of such size as will carry said rounded corners by the stapler and avoid the driving of staples in the bent portions of the work.

8. A basket-making machine comprising a stapler and a form with rounded corners upon which the parts of the basket are assembled, gearing for the stapler and other gearing for the form, a pawl and ratchet-wheel between the gearing the teeth of the ratchet-wheel being so ordinated that the gearing for the form will be actuated with respect to the stapler or the movement imparted thereto so that the corners of the form will be carried past the stapler to avoid the insertion of staples in the parts of the basket which overlie the rounded corners of the form.

In testimony whereof we have hereunto set our hands in presence of the subscribing witnesses.

JOHN E. DURHAM.
JOSEPH E. DEVINE.

Witnesses as to John E. Durham:
L. W. McDONALD,
G. H. PLUMMER.

Witnesses as to J. E. Devine:
D. M. GERBER,
E. E. WEED.